(12) United States Patent
Hirai et al.

(10) Patent No.: US 8,698,342 B2
(45) Date of Patent: Apr. 15, 2014

(54) WIND TURBINE GENERATING APPARATUS

(75) Inventors: Shigeto Hirai, Tokyo (JP); Shinsuke Sato, Tokyo (JP); Tatsuo Ishiguro, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/244,383

(22) Filed: Sep. 24, 2011

(65) Prior Publication Data

US 2012/0025541 A1 Feb. 2, 2012

Related U.S. Application Data

(63) Continuation of application No. PCT/JP2011/064978, filed on Jun. 29, 2011.

(30) Foreign Application Priority Data

Jun. 30, 2010 (JP) ................................ 2010-150474

(51) Int. Cl.
*F03D 9/00* (2006.01)
*F03D 11/02* (2006.01)

(52) U.S. Cl.
USPC ................................ 290/55; 290/44; 416/95

(58) Field of Classification Search
USPC .................... 290/44, 55; 415/108; 416/95
See application file for complete search history.

(56) References Cited

U.S. PATENT DOCUMENTS

| 6,676,122 | B1 * | 1/2004 | Wobben ........................ 290/55 |
| 7,161,260 | B2 | 1/2007 | Kruger-Gotzmann et al. |
| 2005/0242233 | A1 * | 11/2005 | Battisti .......................... 244/58 |
| 2007/0222223 | A1 * | 9/2007 | Bagepalli et al. ............... 290/55 |
| 2008/0290662 | A1 * | 11/2008 | Matesanz Gil et al. ......... 290/44 |
| 2010/0061853 | A1 * | 3/2010 | Bagepalli ....................... 416/95 |
| 2010/0117372 | A1 * | 5/2010 | McMaster ...................... 290/55 |
| 2010/0127502 | A1 * | 5/2010 | Uchino et al. .................. 290/55 |
| 2010/0140952 | A1 * | 6/2010 | Jansen ............................ 290/55 |
| 2010/0148514 | A1 * | 6/2010 | Sato et al. ....................... 290/55 |
| 2011/0000640 | A1 * | 1/2011 | Jensen ............................ 165/47 |
| 2011/0103950 | A1 * | 5/2011 | Pesetsky et al. .................. 416/1 |
| 2011/0133472 | A1 * | 6/2011 | Middendorf .................... 290/55 |
| 2011/0133483 | A1 * | 6/2011 | Yoneda et al. ................ 290/1 B |
| 2011/0175368 | A1 * | 7/2011 | Sato et al. .................... 290/1 B |
| 2011/0217169 | A1 * | 9/2011 | Becker ........................... 416/95 |
| 2011/0221204 | A1 * | 9/2011 | Kim et al. ....................... 290/55 |

(Continued)

FOREIGN PATENT DOCUMENTS

| JP | 55153846 U | 11/1980 |
| JP | 5761965 U | 4/1982 |

(Continued)

OTHER PUBLICATIONS

ISR for PCT/JP2011/064978, dated Oct. 4, 2011.

(Continued)

*Primary Examiner* — Tulsidas C Patel
*Assistant Examiner* — Viet Nguyen
(74) *Attorney, Agent, or Firm* — Benjamin J. Hauptman; Manabu Kanesaka

(57) ABSTRACT

A wind turbine generating apparatus includes a rotor head that rotates upon receiving outside wind on a wind turbine blade, a generator that generates electricity, and a nacelle interior air passage through which outside air flows isolatedly from an interior space of the nacelle.

20 Claims, 10 Drawing Sheets

(56) References Cited

U.S. PATENT DOCUMENTS

| | | | | |
|---|---|---|---|---|
| 2011/0241353 | A1* | 10/2011 | Numajiri | 290/1 B |
| 2011/0254280 | A1* | 10/2011 | Hirai et al. | 290/55 |
| 2011/0304149 | A1* | 12/2011 | Pasteuning et al. | 290/55 |
| 2012/0049532 | A1* | 3/2012 | Scholte-Wassink | 290/55 |
| 2012/0269625 | A1* | 10/2012 | Sabhapathy | 416/1 |

FOREIGN PATENT DOCUMENTS

| | | | |
|---|---|---|---|
| JP | 2003504562 A | | 2/2003 |
| JP | 2003343417 A | | 12/2003 |
| JP | 2005069082 A | * | 3/2005 |
| JP | 2009091929 A | | 4/2009 |
| JP | 2010-007649 | | 1/2010 |
| WO | WO 2009115100 A1 | * | 9/2009 |
| WO | WO 2010024650 A2 | * | 3/2010 |

OTHER PUBLICATIONS

Decision to Grant a Patent mailed Dec. 24, 2013, corresponds to Japanese patent application No. 2010-150474.

* cited by examiner

WIND TURBINE GENERATING APPARATUS

CROSS-REFERENCE TO RELATED APPLICATIONS

This is a continuation of International Application PCT/JP2011/64978, with an international filing date of Jun. 29, 2011, which is hereby incorporated by reference herein in its entirety.

BACKGROUND OF THE INVENTION

1. Field of the Invention

The present invention relates to a wind turbine generating apparatus which cools down heat generated by devices during operation by introducing outside air.

2. Description of Related Art

A typical wind turbine generating apparatus is an apparatus which generates electricity by causing a rotor head with wind turbine blades to rotate upon receiving wind power, increasing the speed of rotation by a gear box, and thereby driving a generator. The rotor head is attached at an end portion of a nacelle that is installed on a tower erected on the ground or the like so as to be movable in a yaw direction. The rotor head is supported rotatably around a rotational axis in a substantially-horizontal lateral direction.

Heat generating devices including the generator are installed inside the nacelle. Heat generating devices such as a converter and a transformer may be also installed inside the tower. Thus, it is necessary to appropriately cool down the electric devices to keep stable operation.

As a conventional simple cooling structure, for example, Japanese Unexamined Patent Application, Publication No. 2010-007649 discloses a wind turbine generating apparatus which cools down a heat generating device by installing a ventilating fan inside a nacelle and forcibly introducing cool outside air into the nacelle.

For example, U.S. Pat. No. 7,161,260 also discloses a wind turbine generating apparatus in which a heat generating device installed inside a nacelle is enclosed in a capsule. The wind turbine generating apparatus includes a closed-loop air passage in which cooling air is circulated by a fan within the capsule. A cooler is interposed in the closed-loop air passage such that the cooler is installed on the leeward side of a wind turbine blade; thereby the cooler is air-cooled by outside wind and heat exchange between the cooling air that flows through the cooler and the outside wind is performed.

However, in the wind turbine generating apparatus disclosed in Japanese Unexamined Patent Application, Publication No. 2010-007649, outside air is introduced into the nacelle by the ventilating fan. Thus, corrosion or contamination easily occurs in structures or devices inside the nacelle due to foreign substances such as moisture, salt content, and dust contained in the outside air, which is mechanically and electrically not preferable. To improve the problem, a filter for removing foreign substances needs to be provided in an outside air inlet of the nacelle. A pressure loss is caused when the filter is installed. Thus, a sufficient volume of outside wind cannot be introduced.

The wind turbine generating apparatus disclosed in U.S. Pat. No. 7,161,260 has an advantage that the heat generating device is not in contact with outside air since the heat generating device is enclosed in a capsule. However, there are also problems that the inner structure of the nacelle is complicated, and the air-cooling cooler inevitably has a large size to increase the entire size of the nacelle. Moreover, the cooler is always exposed to outside air and thus needs to be sufficiently prepared against corrosion. Accordingly, the construction cost of the wind turbine generating apparatus is increased due to the above factors.

BRIEF SUMMARY OF THE INVENTION

The present invention has been made in view of the aforementioned circumstances, and it is an object of the present invention to provide a wind turbine generating apparatus which can satisfactorily cool down heat generating devices installed inside a nacelle and a tower and can also protect the devices against corrosion or contamination with a simple, compact and inexpensive configuration.

To solve the above problems, the present invention employs the following solutions.

That is, a wind turbine generating apparatus which includes a rotor head that rotates upon receiving outside wind on a wind turbine blade, a generator, installed inside a nacelle and driven by the rotor head, that generates electricity, and a nacelle interior air passage, provided inside the nacelle, through which outside air flows isolatedly from an interior space of the nacelle.

With the wind turbine generating apparatus, the interior space of the nacelle, that is, a heat generating device installed inside the nacelle can be cooled down by the outside air that flows through the nacelle interior air passage. Moreover, the interior space of the nacelle can be thereby hermetically sealed. Thus, nacelle internal devices including the heat generating device can be prevented from contacting outside air, and thereby protected against corrosion or contamination.

In the wind turbine generating apparatus according to a first aspect of the present invention, the nacelle interior air passage may be formed such that a passage area is reduced from an upstream side to a downstream side. Accordingly, the flow speed of cooling air that flows through the nacelle interior air passage can be increased, to thereby improve the cooling efficiency.

In the wind turbine generating apparatus according to a second aspect of the present invention, at least a portion of a wall body that is included in the nacelle may have a double-walled structure with an outer wall and an inner wall that is provided inside the outer wall with a space therebetween, and the space between the outer wall and the inner wall may be employed as the nacelle interior air passage.

With the above configuration, the surface area of the nacelle interior air passage can be increased, to thereby improve the cooling efficiency. As the interval between the outer wall and the inner wall is smaller, the flow speed of cooling air passing therethrough is increased. The cooling efficiency is thereby improved. Accordingly, even with the double-walled structure, the thickness of the wall body constituting the nacelle is not increased a lot, so that the nacelle can be compactly formed.

In the wind turbine generating apparatus according to a third aspect of the present invention, at least one tubular outside air flow passage may be provided inside the nacelle, and an inner portion of the outside air flow passage is employed as the nacelle interior air passage. Accordingly, the nacelle interior air passage can be relatively easily provided inside the nacelle. Also, the nacelle interior air passage can be added to an existing wind turbine generating apparatus.

In the wind turbine generating apparatus according to a fourth aspect of the present invention, a heat generating device installed in the interior space of the nacelle may be provided adjacent to the nacelle interior air passage. Accordingly, the heat generating device can be effectively cooled down by the outside air flowing through the nacelle interior air passage with a simple configuration.

In the wind turbine generating apparatus according to a fifth aspect of the present invention, a heat transferring means that transfers heat from the interior space of the nacelle to the nacelle interior air passage may be provided. Accordingly, the heat of the heat generating device installed inside the nacelle can be actively transferred to the nacelle interior air passage, and the heat generating device can be more effectively cooled down.

In the wind turbine generating apparatus according to a sixth aspect of the present invention, an asperity shape may be provided on the nacelle interior air passage. Accordingly, the surface area of the nacelle interior air passage can be increased, to thereby improve the cooling efficiency. As the asperity shape, the wall constituting the nacelle interior air passage may be formed by a corrugated sheet, or ribs may be provided projecting from the wall.

In the wind turbine generating apparatus according to a seventh aspect of the present invention, a wind turbine interior air passage through which cooling air passing through the nacelle interior air passage is discharged outside after passing through periphery of a heat generating device installed inside the rotor head and inside of the wind turbine blade may be provided.

With the above configuration, the cooling air flowing through the nacelle interior air passage and the wind turbine interior air passage is suctioned by a negative pressure generated when the wind turbine blade rotates, and is thereby discharged outside. Thus, the flow speed of the cooling air can be increased, to thereby improve the cooling efficiency. Moreover, the heat generating device provided inside the rotor head can be cooled down while employing the hermetically sealed structure therein. Thus, the heat generating device can be prevented from contacting outside air, and thereby protected against corrosion or contamination.

In the wind turbine generating apparatus according to an eighth aspect of the present invention, an air outlet to outside of the wind turbine interior air passage may be formed on a leeward side of the wind turbine blade to a wind direction. Accordingly, a high negative pressure is applied to the air outlet. The flow speed and the flow rate of the cooling air flowing through the nacelle interior air passage, the wind turbine interior air passage and a tower interior air passage can be increased, to thereby improve the cooling efficiency.

In the wind turbine generating apparatus according to a ninth aspect of the present invention, the air outlet may be formed in the vicinity of a root of the wind turbine blade. Accordingly, the entire length of the wind turbine interior air passage inside the wind turbine blade can be reduced, to avoid a pressure loss. The flow speed and the flow rate of the cooling air can be increased, to thereby improve the cooling efficiency.

In the wind turbine generating apparatus according to a tenth aspect of the present invention further includes a tower interior air passage through which outside air flows as cooling air may be provided inside a tower where the nacelle is installed at an upper end portion and a heat generating device installed in the interior space of the tower, wherein the tower interior air passage may be isolated from an interior space of the tower, wherein the heat generating device installed in the interior space of the tower may be provided adjacent to the tower interior air passage, and wherein the tower interior air passage may communicate with the nacelle interior air passage.

With the above configuration, the heat generating device provided inside the tower can be effectively cooled down, and the interior space of the tower can be hermetically sealed. Thus, tower internal devices including the heat generating device can be prevented from contacting outside air, and thereby protected against corrosion or contamination.

An embodiment includes a wind turbine generating apparatus comprising a rotor head that rotates upon receiving outside wind on a wind turbine blade, a generator, installed inside a nacelle and driven by the rotor head, that generates electricity, a nacelle interior air passage, provided inside the nacelle, through which outside air flows isolatedly from an interior space of the nacelle, wherein the interior space is in effective conductive heat-transfer communication with the interior air passage, and wherein the nacelle is configured such that the interior air passage establishes a convection flow that extracts heat from the interior air passage transferred thereto from the interior space via the conductive communication. In an alternate embodiment, in this wind turbine generating apparatus, the nacelle is configured such that forced air convection occurs inside the interior space in isolation from any flow of air through the nacelle air passage. In an alternate embodiment, in this wind turbine generating apparatus, the nacelle is configured such that the nacelle interior air passage extends about a substantial amount of the circumference of the interior space. In an alternate embodiment, in this wind turbine generating apparatus, the nacelle is configured such that the nacelle interior air passage cups the interior space. In an alternate embodiment, in this wind turbine generating apparatus, the apparatus includes a heat generating device located in the interior space of the nacelle that is in convective heat transfer isolation with respect to heat transfer paths extending from an inside of the interior space to the nacelle interior air passage.

DETAILED DESCRIPTION OF THE INVENTION

In the following, embodiments of a wind turbine generating apparatus according to the present invention will be described based on the drawings.

Figure 1:
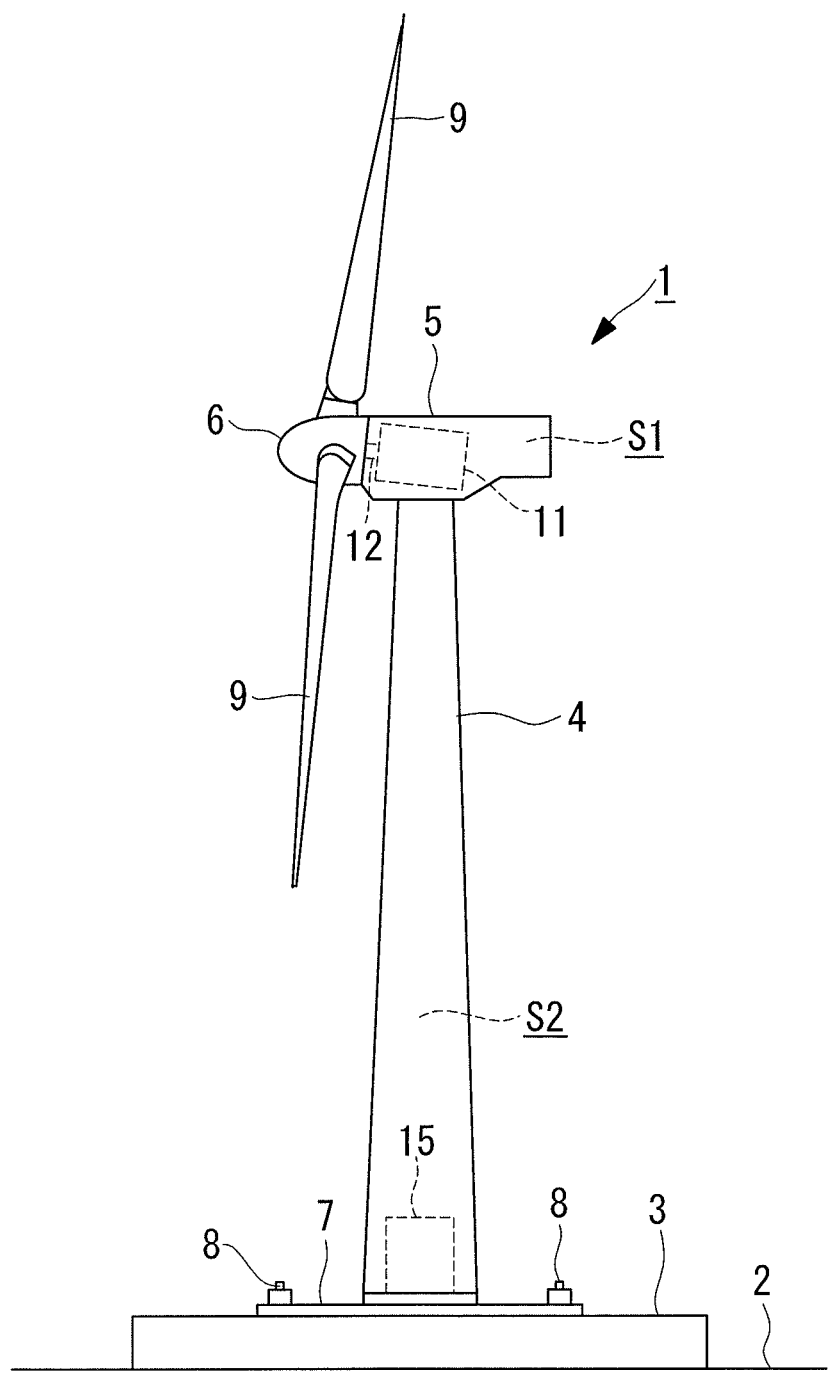
FIG. 1 is a side view illustrating one example of a wind turbine generating apparatus to which each embodiment of the present invention is applicable.

FIG. 1 is a side view illustrating one example of a wind turbine generating apparatus to which cooling structures A to G in the respective embodiments described below are applicable. The wind turbine generating apparatus 1 includes a tower 4 that is erected on a reinforced concrete foundation 3 installed on a ground 2, a nacelle 5 that is installed at an upper end portion of the tower 4, and a rotor head 6 that is provided on the front end side of the nacelle 5 so as to be supported rotatably around a rotational axis in a substantially-horizontal lateral direction. In the example, a so-called up-wind wind turbine where the rotor head 6 is provided on the front end side of the nacelle 5 will be described. It will be obvious to a person skilled in the art that the present invention may be also applied to a down-wind wind turbine where the rotor head 6 is provided on the rear end side of the nacelle 5.

The tower 4 is a steel pipe monopole type, and has a substantially circular shape in cross section. A base plate 7 made of steel, for example, is fixed to a lower end portion of the tower 4. The base plate 7 is fastened to the foundation 3 by a plurality of anchor bolts 8. A plurality of (for example, three) wind turbine blades 9 are attached to the rotor head 6 so as to radially extend. A generator 11 is accommodated inside the nacelle 5. A rotational shaft 12 of the rotor head 4 is connected to a main shaft of the generator 11 via a gear box 13 (see FIG. 2). Thus, the wind force of outside wind that collides with the wind turbine blades 9 is converted into a rotational force to rotate the rotor head 6 and the rotational shaft 12. The generator 11 is thereby driven to generate electricity.

The nacelle 5 can turn in a horizontal direction at the upper end of the tower 4 together with the wind turbine blades 9. A drive device and a control device (not shown) control the nacelle 5 to be always directed windward to thereby effectively generate electricity. Various heat generating devices such as a main bearing (not shown) and the gear box 13 (see FIG. 2) in addition to the generator 11 are installed in an interior space S1 of the nacelle 5. A well-known hydraulic or electric pitch drive device 14 (see FIG. 2) for adjusting the pitch angle of the wind turbine blade 9 to an optimum angle based on the air volume is provided inside the rotor head 6. The pitch drive device 14 is also heat generating devices which generate heat during operation. Various electric devices 15 are also installed in an interior space S2 of the tower 4. Examples of the electric devices 15 include a converter and a transformer which generate heat.

Since the interior space S1 of the nacelle 5 and the interior space S2 of the tower 4 are hermetically closed, cooling structures A to G in the respective embodiments described below are employed to cool down the heat generating devices 11, 14 and 15 installed in the interior spaces S1 and S2 and in the rotor head 4.

First Embodiment

Figure 2:
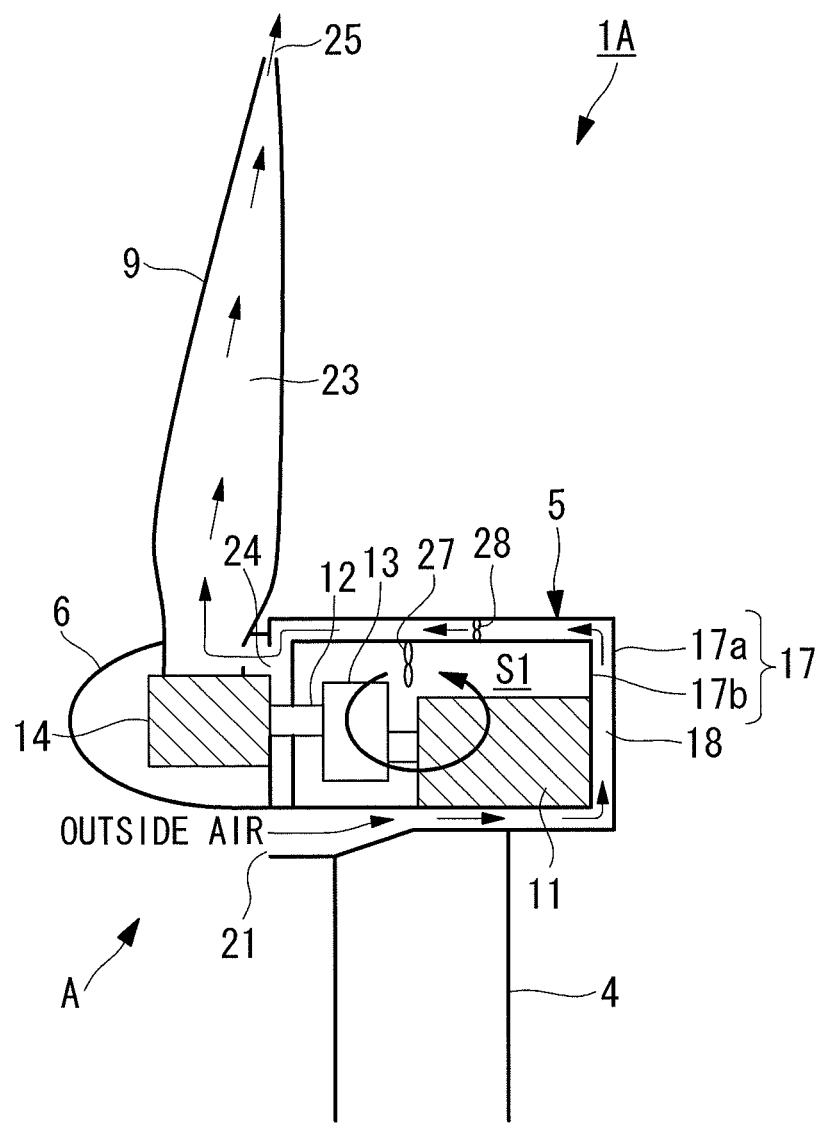
FIG. 2 is a schematic vertical sectional view of a wind turbine generating apparatus according to a first embodiment of the present invention.

FIG. 2 is a schematic vertical sectional view of a wind turbine generating apparatus 1A according to a first embodiment of the present invention. The wind turbine generating apparatus 1A includes a cooling structure A. In the cooling structure A, a wall body 17 constituting the nacelle 5 has a double-walled structure with an outer wall 17a and an inner wall 17b provided inside the outer wall 17a with a space therebetween. The space between the outer wall 17a and the inner wall 17b is employed as a nacelle interior air passage 18. Outside air flows through the nacelle interior air passage 18 as cooling air. Although the entire wall body 17 has the double-walled structure, the wall body 17 may be partially double-walled.

The nacelle interior air passage 18 is completely isolated from the interior space S1 of the nacelle 5. The generator 11 installed as the heat generating device in the interior space S1 is provided adjacent to the nacelle interior air passage 18. To be more specific, the generator 11 is provided in close contact with the bottom surface and the rear surface of the inner wall 17b that constitutes the nacelle interior air passage 18.

The nacelle interior air passage 18 includes an outside wind inlet 21 for introducing outside wind that blows from the front side of the nacelle 5. The outside wind inlet 21 is provided so as to open toward the front side at a position immediately below the rotor head 6 and, if necessary, at right and left side positions of the rotor head 6 in the front surface of the nacelle 5, for example. The opening area of the outside wind inlet 21 is set to be larger than the vertical sectional area of the nacelle interior air passage 18. The passage area of the nacelle interior air passage 18 is gradually reduced from the outside wind inlet 21 to the downstream side as viewed from the side.

Meanwhile, a wind turbine interior air passage 23 is provided through the inside of the rotor head 6 and the inside of the wind turbine blade 9. The wind turbine interior air passage 23 communicates with the nacelle interior air passage 18 via a communication port 24 that opens in the front surface of the nacelle 5. The pitch drive device 14 provided inside the rotor head 6 is hermetically sealed from outside by a rotor hub. The wind turbine interior air passage 23 surrounds the periphery of the pitch drive device 14. An air outlet 25 is provided in the vicinity of the tip of the wind turbine blade 9 so as to communicate the wind turbine interior air passage 23 and the outside.

The cooling structure A having the aforementioned configuration is operated as described below.

When outside wind blows toward the wind turbine generating apparatus 1A, the wind direction of the outside wind is detected, and the nacelle 5 is automatically controlled to direct the front surface windward. The outside wind is thereby introduced as cooling air into the nacelle interior air passage 18 from the outside wind inlet 21 opening in the front surface of the nacelle 5 as indicated by arrows. The cooling air cools down the generator 11 as the heat generating device provided in close contact with the inner wall 17b and air inside the interior space S1 while flowing through the nacelle interior air passage 18. The cooling air passing through the nacelle interior air passage 18 as described above flows into the wind turbine interior air passage 23 through the communication port 24, passes through the periphery of the pitch drive device 14 to cool down the pitch drive device 14 as the heat generating device, and is finally discharged outside from the air outlet 25 through the inside of the wind turbine blade 9.

By employing the cooling structure A, the generator 11 can be effectively cooled down by the outside air flowing through the nacelle interior air passage 18 with a simple configuration in which the generator 11 is provided adjacent to the nacelle interior air passage 18 that is provided isolatedly from the interior space S1 of the nacelle 5. Since the outside air flowing through the nacelle interior air passage 18 flows isolatedly from the interior space S1 of the nacelle 5, the interior space S1 of the nacelle 5 can be hermetically sealed. Internal devices of the nacelle 5 including the generator 11 can be thereby prevented from contacting outside air, and reliably protected against corrosion or contamination.

The wall body 17 constituting the nacelle 5 has the double-walled structure with the outer wall 17a and the inner wall 17b provided inside the outer wall 17a with the space therebetween, and the space between the outer wall 17a and the inner wall 17b is employed as the nacelle interior air passage 18. Thus, the surface area (heat transfer surface) of the nacelle interior air passage 18 can be increased, to thereby improve the cooling efficiency. As the interval between the outer wall 17a and the inner wall 17b is smaller, the flow speed of the cooling air passing therethrough is increased, to thereby improve the cooling efficiency. Accordingly, even with the double-walled structure, the thickness of the wall body 17 is not increased a lot, so that the nacelle 5 can be compactly formed. In a case in which the nacelle 5 is partially double-walled, the nacelle 5 can be more compactly formed.

Moreover, the wind turbine interior air passage 23 is provided through the inside of the rotor head 6 and the inside of the wind turbine blade 9. The pitch drive device 14 provided inside the rotor head 6 is cooled down in a sealed state from outside by the cooling air flowing through the wind turbine interior air passage 23. Thus, the pitch drive device 14 can be cooled down without contacting outside air, and thereby protected against corrosion or contamination.

Since the passage area of the nacelle interior air passage 18 is gradually reduced from the outside wind inlet 21 to the downstream side, the flow speed of the outside air introduced from the outside wind inlet 21 into the nacelle interior air passage 18 is sharply increased. The flow speed of the entire cooling air flowing through the nacelle interior air passage 18 and the wind turbine interior air passage 23 can be thereby increased. Since a negative pressure is applied to the air outlet 25 by the rotation of the wind turbine blade 9, the cooling air flowing through the nacelle interior air passage 18 and the wind turbine interior air passage 23 is suctioned from the air outlet 25. The flow speed of the cooling air can be thereby further increased. By increasing the flow speed of the cooling air as described above, the cooling efficiency of the heat generating devices such as the generator 11 and the pitch drive device 14 provided adjacent to the nacelle interior air passage 18 and the wind turbine interior air passage 23 can be improved.

If necessary, an air blowing device such as a circulating fan 27 may be installed in the interior space S1 of the nacelle 5 to circulate the air inside the interior space S1. Thus, the generator 11 or the like can be prevented from locally increasing in temperature. The generated heat can be widely transferred to the inner wall 17b, to thereby increase the heat exchange effectiveness. Accordingly, the cooling performance can be improved. Similarly, a blower fan 28 or the like may be installed inside the nacelle interior air passage 18, to further increase the flow speed of the cooling air in the nacelle interior air passage 18 and the wind turbine interior air passage 23. Accordingly, the cooling efficiency can be improved.

Second Embodiment

Figure 3:
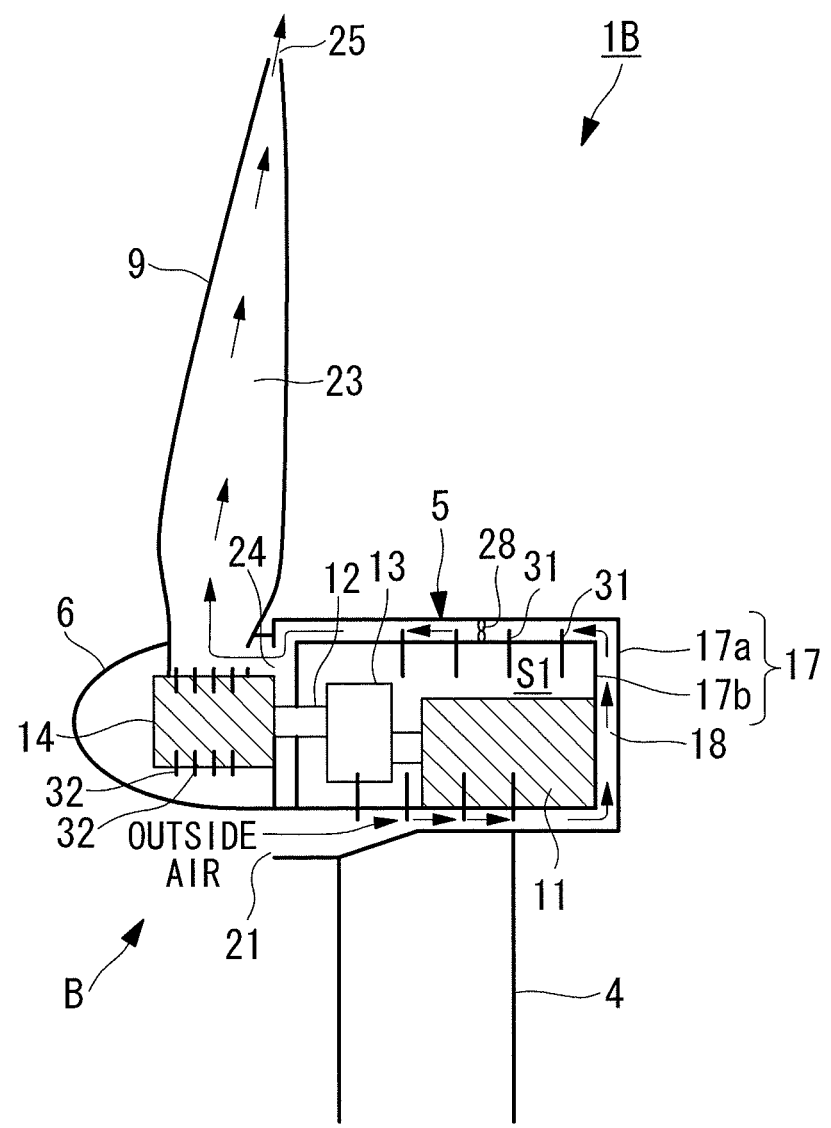
FIG. 3 is a schematic vertical sectional view of a wind turbine generating apparatus according to a second embodiment of the present invention.

FIG. 3 is a schematic vertical sectional view of a wind turbine generating apparatus 1B according to a second embodiment of the present invention. The wind turbine generating apparatus 1B includes a cooling structure B. The cooling structure B differs from the cooling structure A in the above first embodiment only in that heat transferring means for transferring the heat of the interior space S1 the nacelle 5 to the nacelle interior air passage 18 is provided on the inner wall 17b that constitutes the nacelle interior air passage 18, and heat transferring means for transferring the heat generated from the pitch drive device 14 to the wind turbine interior air passage 23 is provided. The other components have the same configuration. For example, heat pipes 31 and 32 are employed as the heat transferring means.

The heat pipes 31 and 32 have a well-known structure in which a working fluid such as CFC substitutes is enclosed in a copper pipe, for example. The heat pipe 31 installed in the interior space S1 of the nacelle 5 may be provided in contact with the heat generating devices such as the generator 11. The heat pipe 31 may be installed not only adjacent to the heat generating devices, but also over the entire surface of the inner wall 17b constituting the nacelle interior air passage 18. The heat pipe 32 provided on the pitch drive device 14 is disposed so as to penetrate a casing of the pitch drive device 14.

In the cooling structure B, the outside wind introduced as the cooling air from the outside wind inlet 21 that opens in the front surface of the nacelle 5 cools down the heat generated from the heat generating devices such as the generator 11 and the pitch drive device 14 through the nacelle interior air passage 18 and the wind turbine interior air passage 23, and is subsequently discharged outside from the air outlet 25 in a similar manner to the cooling structure A in the first embodiment. The heat generated from the heat generating devices such as the generator 11 and the pitch drive device 14 is effectively transferred to the nacelle interior air passage 18 and the wind turbine interior air passage 23 due to the heat transfer action of the heat pipes 31 and 32. Accordingly, the heat generating devices can be more effectively cooled down by actively dissipating the heat into the cooling air.

Third Embodiment

Figure 4:
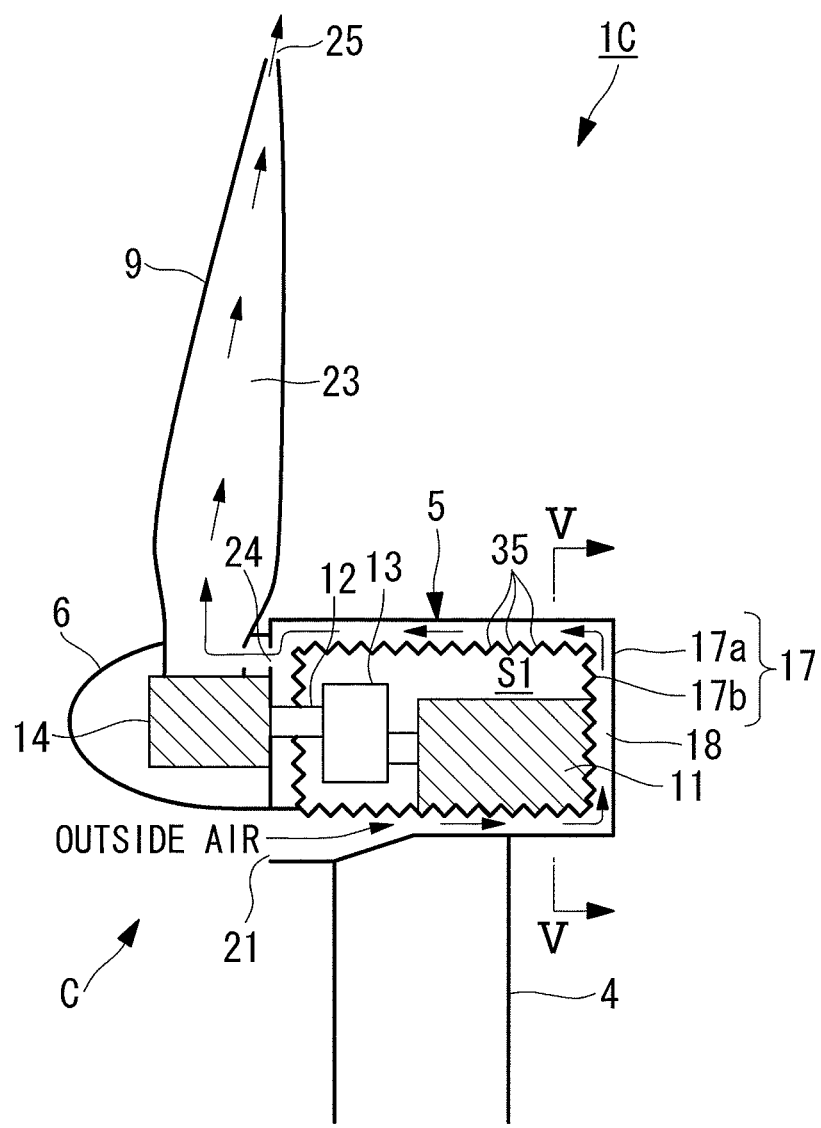
FIG. 4 is a schematic vertical sectional view of a wind turbine generating apparatus according to a third embodiment of the present invention.
Figure 5A:
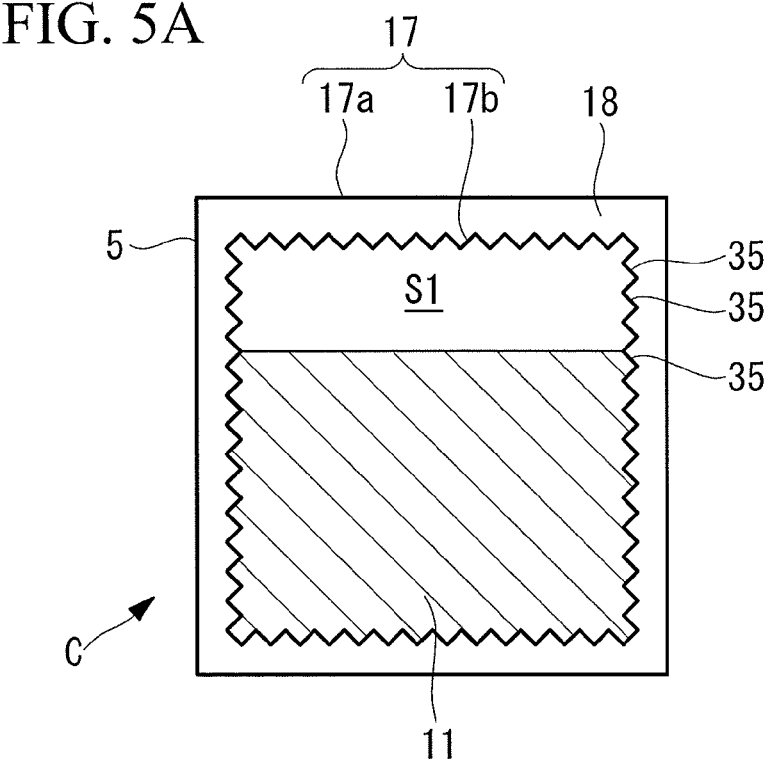
FIG. 5A is a vertical sectional view taken along a line V-V in FIG. 4 illustrating an example in which an inner wall is formed by a corrugated sheet.
Figure 5B:
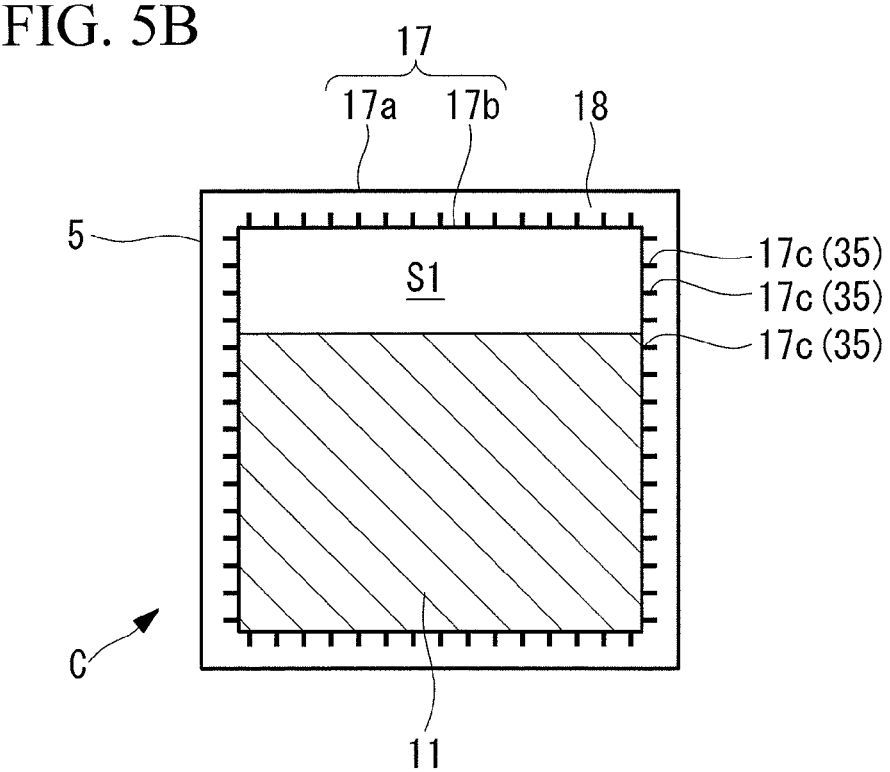
FIG. 5B is a vertical sectional view taken along the line V-V in FIG. 4 illustrating an example in which ribs are provided projecting from the outer surface of the inner wall.

FIG. 4 is a schematic vertical sectional view of a wind turbine generating apparatus 1C according to a third embodiment of the present invention. The wind turbine generating apparatus 1C includes a cooling structure C. The cooling structure C differs from the cooling structure A in the first embodiment only in that an asperity shape 35 is provided on the inner wall 17b constituting the nacelle interior air passage 18. The other components have the same configuration as that of the cooling structure A. As a formation example of the asperity shape 35, the inner wall 17b may be formed by a corrugated sheet as shown in FIG. 5A, or a plurality of ribs 17c may be provided projecting from the outer surface of the inner wall 17b as shown in FIG. 5B.

Although it is shown in FIG. 4 that the longitudinal direction of grooves of the asperity shape 35 formed by the corrugated sheet is aligned with the width direction of the nacelle 5 (a direction perpendicular to the paper surface), the grooves of the asperity shape 35 are actually preferably formed along the flowing direction of the outside wind that is introduced from the outside wind inlet 21 into the nacelle interior air passage 18. The longitudinal direction of the ribs 17c shown in FIG. 5B is also preferably formed along the flowing direction of the outside wind. The asperity shape 35 may be also provided on the casings of the heat generating devices themselves such as the generator 11 and the pitch drive device 14.

By providing the asperity shape 35 on the inner wall 17b that constitutes the nacelle interior air passage 18 as in the cooling structure C, the surface areas of the inner and outer surfaces of the inner wall 17b are increased. The inner wall 17b thereby effectively receives the heat generated from the heat generating devices such as the generator 11 and the temperature in the interior space S1 rising due to the heat. The heat is dissipated into the cooling air that flows through the nacelle interior air passage 18, to thereby improve the cooling efficiency of the interior space S1. When the asperity shape is provided on the casings of the heat generating devices 11 and 14 themselves, the heat can be more effectively dissipated. The cooling air used for cooling is discharged outside from the air outlet 25 through the wind turbine interior air passage 23.

Fourth Embodiment

Figure 6:
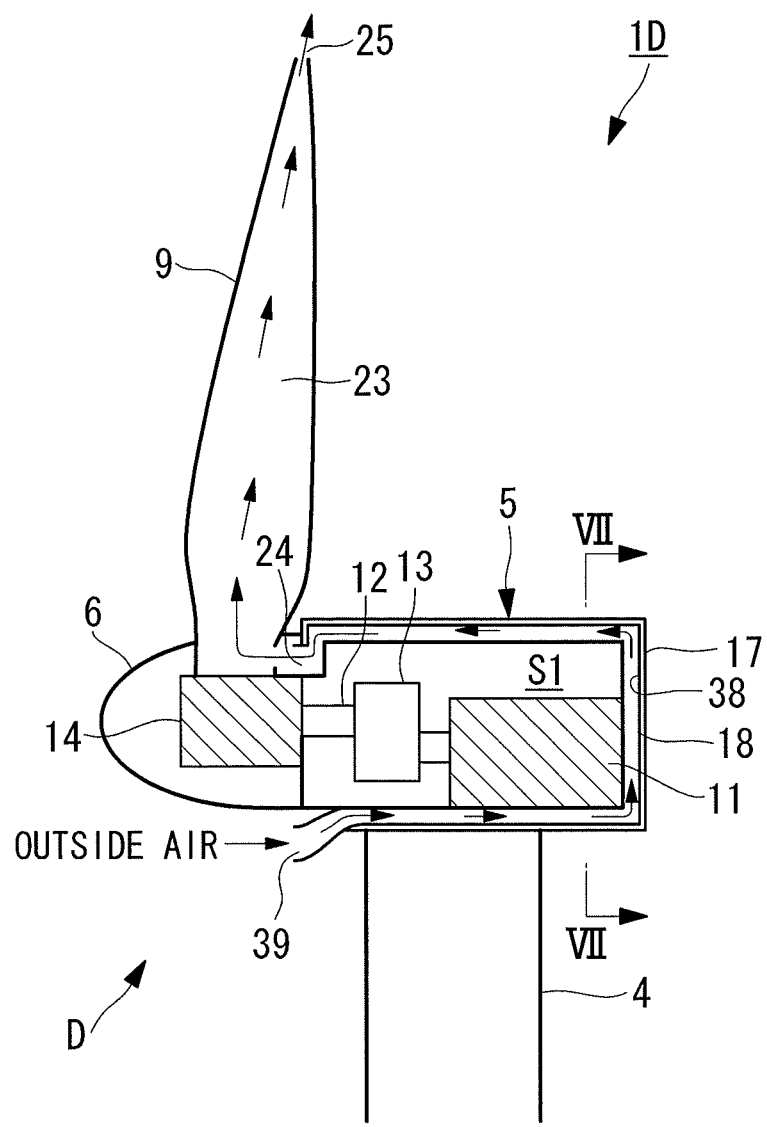
FIG. 6 is a schematic vertical sectional view of a wind turbine generating apparatus according to a fourth embodiment of the present invention.
Figure 7A:
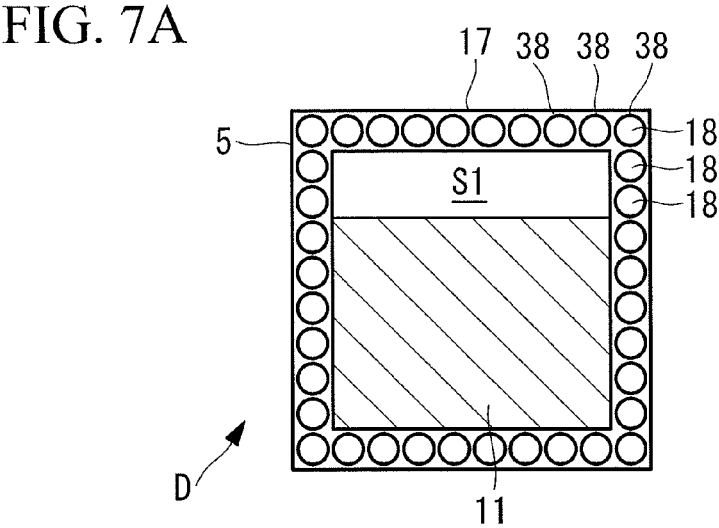
FIG. 7A is a vertical sectional view taken along a line VII-VII in FIG. 6 illustrating an example in which pipes having a circular shape in section are used to provide outside air flow passages.
Figure 7B:
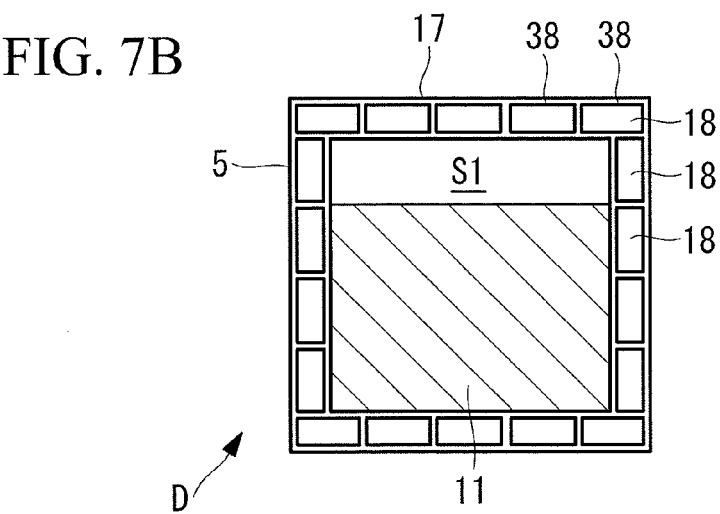
FIG. 7B is a vertical sectional view taken along the line VII-VII in FIG. 6 illustrating an example in which pipes having a flat rectangular shape in section are used to provide the outside air flow passages.
Figure 7C:
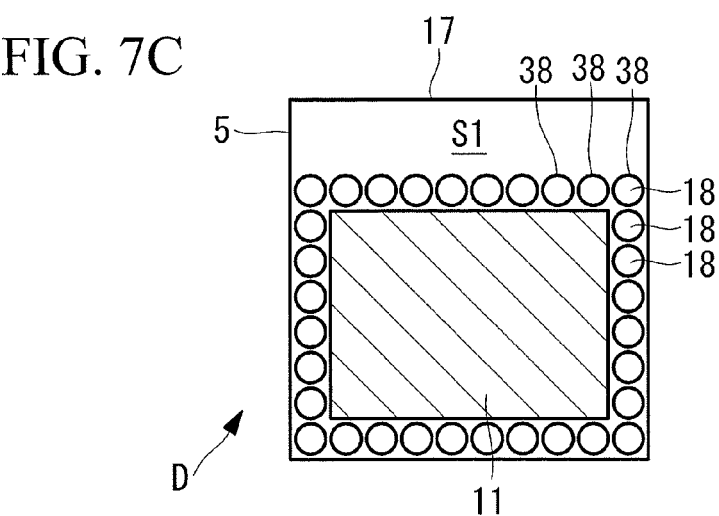
FIG. 7C is a vertical sectional view taken along the line VII-VII in FIG. 6 illustrating an example in which the outside air flow passages surround a heat generating device over the entire periphery.

FIG. 6 is a schematic vertical sectional view of a wind turbine generating apparatus 1D according to a fourth embodiment of the present invention. FIGS. 7A to 7C are vertical sectional views taken along a line VII-VII in FIG. 6. The wind turbine generating apparatus 1D includes a cooling structure D. The cooling structure D differs from the cooling structure A in the first embodiment in that the wall body 17 constituting the nacelle 5 does not have the double-walled structure, a plurality of tubular outside air flow passages 38 are disposed in a cage shape, for example, inside the nacelle 5, and an inner portion of each of the outside air flow passages 38 is employed as the nacelle interior air passage 18.

The outside air flow passages 38 are disposed so as to extend in a front-back direction in the upper, lower, right and left surfaces of the wall body 17 of the nacelle 5 and in a vertical direction in the rear surface of the wall body 17, for example. Please note that the outside air flow passages 38 may be disposed in any direction. Although the respective outside air flow passages 38 are arranged in close contact with each other, the outside air flow passages 38 may be also disposed at an appropriate interval. An opening portion 39 of each of the outside air flow passages 38 is provided so as to open toward a front side at a position immediately below the rotor head 6, or at right and left side positions of the rotor head 6 in the front surface of the nacelle 5 in a similar manner to the position of the outside wind inlet 21 in the cooling structure A in the first embodiment.

The heat generating devices such as the generator 11 installed inside the nacelle 5 are provided adjacent to the outside air flow passages 38, that is, the nacelle interior air passages 18. In the embodiment, the nacelle interior air passages 18 are adjacent to the bottom surface, the right and left side surfaces and the rear surface of the generator 11. An end portion of each of the nacelle interior air passages 18 communicates with the wind turbine interior air passage 23 formed through the inside of the rotor head 6 and the inside of the wind turbine blade 9 via the communication port 24 in a similar manner to the cooling structure A in the first embodiment.

A funnel shape is employed by setting the opening area of the opening portion 39 of each outside air flow passage 38 to be larger than the vertical sectional area of an intermediate portion of the outside air flow passage 38, and gradually reducing the passage area from the opening portion 39 to the downstream side. Accordingly, the flow speed of the cooling air that flows through the inner portion of the outside air flow passage 38 (the nacelle interior air passage 18) can be increased, to thereby improve the cooling efficiency. Also, the outside air flow passages 38 may have a single opening portion 39, from which the plurality of outside air flow passages 38 may be branched toward the downstream side.

In the cooling structure D, the outside wind that blows toward the front surface of the nacelle 5 partly flows into the nacelle interior air passage 18 from the opening portion 39 of each outside air flow passage 38, and cools down the heat generating devices such as the generator 11 adjacent to the nacelle interior air passage 18 while passing through the periphery of the interior space S1 of the nacelle 5. The outside wind subsequently flows into the wind turbine interior air passage 23 through the communication port 24 to cool down the pitch drive device 14, and is then discharged outside from the air outlet 25 at the tip of the wind turbine blade 9.

With the cooling structure D, the nacelle interior air passage 18 can be relatively easily provided inside the nacelle 5. The wind turbine interior air passage 23 may be combined therewith if necessary. Accordingly, the heat of the heat generating devices such as the generator 11 and the pitch drive device 14 can be cooled down. The entire interior space S1 of the nacelle 5 and the heat generating devices such as the pitch drive device 14 can be hermetically sealed from outside, so that the devices such as the generator 11 and the pitch drive device 14 can be protected against corrosion or contamination. Furthermore, the nacelle interior air passage 18 can be relatively easily added to an existing wind turbine generating apparatus without the nacelle interior air passage 18.

As shown in FIG. 7B, the pipe sectional shape of the outside air flow passage 38 may be a rectangular shape or a flat shape. Accordingly, the outside air flow passage 38 is brought into contact with the heat generating devices such as the generator 11 and the wall body 17 of the nacelle 5 with a larger area, to thereby improve the cooling efficiency. The heat generating devices can be more reliably cooled down by providing the outside air flow passages 38 (the nacelle interior air passages 18) so as to enclose the heat generating devices such as the generator 11 as shown in FIG. 7C if necessary.

Fifth Embodiment

Figure 8:
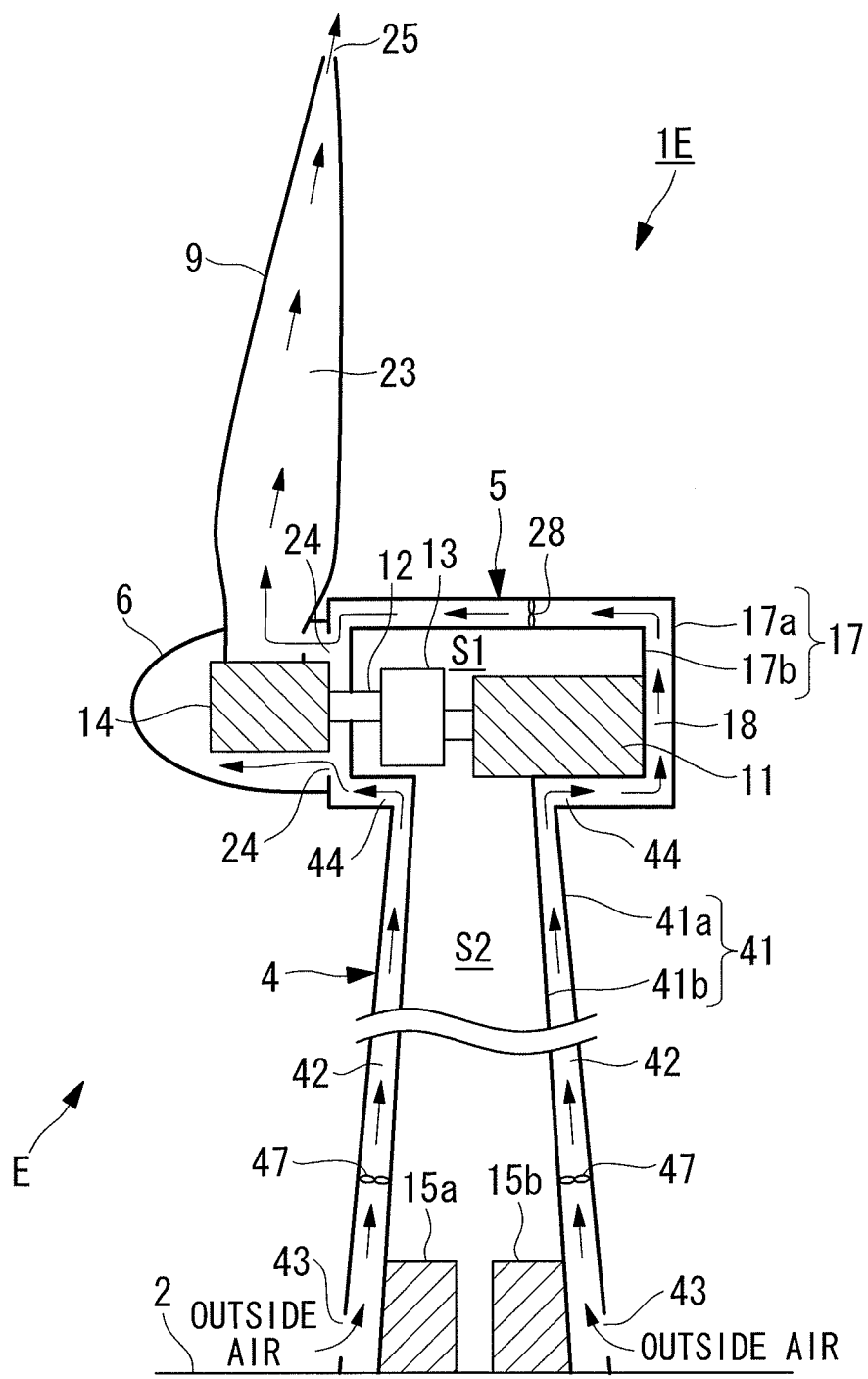
FIG. 8 is a schematic vertical sectional view of a wind turbine generating apparatus according to a fifth embodiment of the present invention.

FIG. 8 is a schematic vertical sectional view of a wind turbine generating apparatus 1E according to a fifth embodiment of the present invention. The wind turbine generating apparatus 1E includes a cooling structure E. In the wind turbine generating apparatus 1E (the cooling structure E), a wall body 41 constituting the tower 4 has a double-walled structure with an outer wall 41a and an inner wall 41b provided inside the outer wall 41a with a space therebetween. The inside of the inner wall 41b is employed as the interior space S2. The space between the outer wall 41a and the inner wall 41b is employed as a tower interior air passage 42. The tower interior air passage 42 is isolated from the interior space S2. Heat-generating electric devices such as a converter 15a and a transformer 15b installed in the interior space S2 are provided adjacent to the tower interior air passage 42 (the inner wall 41b). Although the entire wall body 41 has the double-walled structure, a portion of the wall body 41 may be double-walled to partially provide the tower interior air passage 42. The converter 15a and the transformer 15b may be provided adjacent thereto.

One or a plurality of outside wind inlets 43 are provided in the circumferential surface of the outer wall 41a close to the ground 2, for example. Outside air is introduced therefrom into the tower interior air passage 42 as cooling air. Meanwhile, the nacelle interior air passage 18 similar to those of the cooling structures A and B in the above first and second embodiments is formed inside the nacelle 5. However, the outside wind inlet 21 as in the cooling structures A and B is not provided in the nacelle interior air passage 18, and the nacelle interior air passage 18 communicates with the tower interior air passage 42 via a communication portion 44. In a similar manner to the cooling structures A and B, the nacelle interior air passage 18 communicates with the wind turbine interior air passage 23 via the communication port 24.

The cooling structure E having the aforementioned configuration is operated as follows.

When outside wind blows toward the wind turbine generating apparatus 1E, the outside wind is introduced as cooling air into the tower interior air passage 42 from the outside wind inlet 43 as indicated by arrows, and cools down the heat-generating converter 15*a* and the transformer 15*b* provided adjacent to the tower interior air passage 42 in close contact with the inner wall 41*b*, and air inside the interior space S2 while flowing through the tower interior air passage 42. The cooling air subsequently rises through the tower interior air passage 42, and flows into the nacelle interior air passage 18 through the communication portion 44. In a similar manner to the above cooling structures A and B, the cooling air subsequently cools down the generator 11 as the heat generating device provided in close contact with the inner wall 17*b* of the nacelle 5, flows into the wind turbine interior air passage 23 through the communication port 24 to cool down the pitch drive device 14, and is finally discharged outside from the air outlet 25 through the inside of the wind turbine blade 9.

A circulating fan 47 may be installed inside the tower interior air passage 42 if necessary. The circulating fan 47 actively feeds the cooling air flowing through the tower interior air passage 42 to the nacelle interior air passage 18. The circulating fan 47 is allowed to work together with the blower fan 28 provided inside the nacelle interior air passage 18 to increase the volume of cooling air. Accordingly, the cooling performance can be improved.

With the cooling structure E, not only the heat generating devices (the generator 11) provided inside the nacelle 5, but also the heat generating devices (the converter 15*a* and the transformer 15*b*) provided inside the tower 4 can be effectively cooled down. Since the interior space S2 of the tower 4 can be hermetically sealed, tower internal devices including the converter 15*a* and the transformer 15*b* can be prevented from contacting outside air, and thereby protected against corrosion or contamination.

Sixth Embodiment

Figure 9:
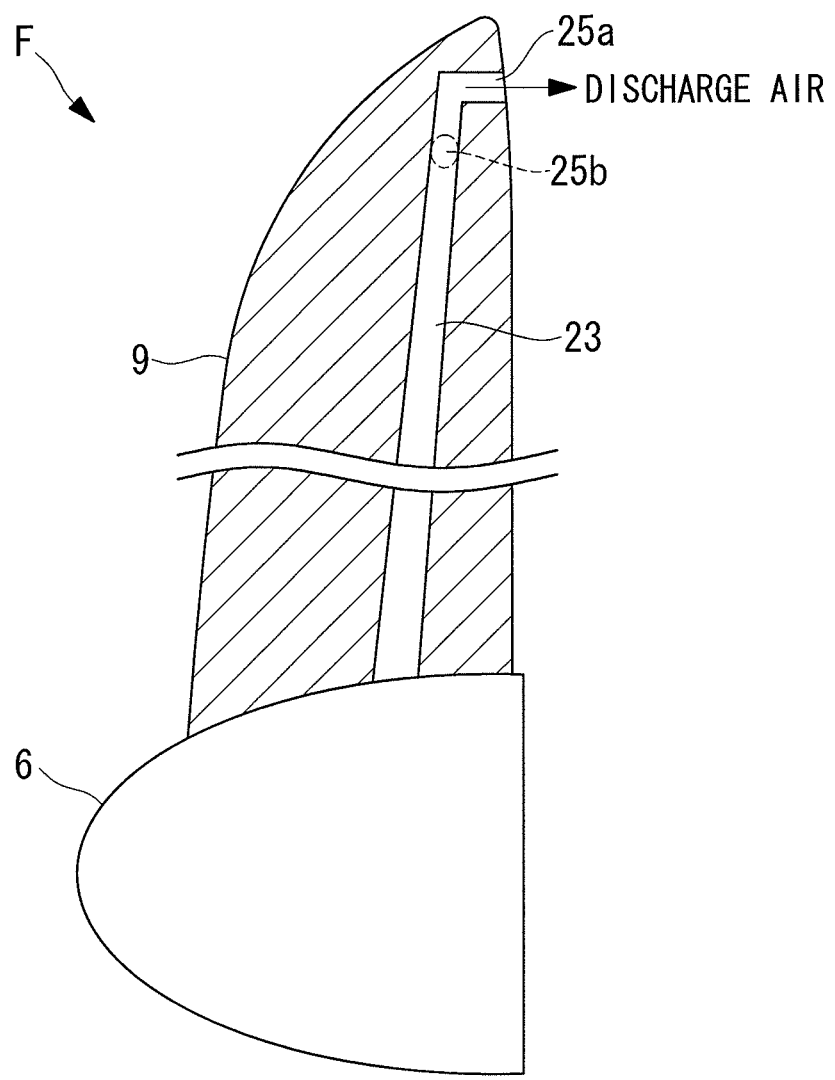
FIG. 9 is a schematic vertical sectional view of a wind turbine blade according to a sixth embodiment of the present invention.

FIG. 9 is a schematic vertical sectional view of the wind turbine blade 9 according to a sixth embodiment of the present invention. The wind turbine blade 9 may be applied to the wind turbine generating apparatuses 1A to 1E according to the first to fifth embodiments. The wind turbine blade 9 includes a cooling structure F. In the cooling structure F, an air outlet of the wind turbine interior air passage 23 formed inside the wind turbine blade 9 is formed on the leeward side of the wind turbine blade 9 to the wind direction. That is, an air outlet 25*a* is provided at a trailing edge position of the wind turbine blade 9, or an air outlet 25*b* is provided at a side surface position thereof, for example. In other words, the air outlets 25*a* and 25*b* are preferably provided at a position to which a negative pressure is applied by wind hitting the wind turbine blade 9.

With the cooling structure F, a high negative pressure is applied to the air outlets 25*a* and 25*b* of the wind turbine interior air passage 23. Thus, the flow speed and the flow rate of the cooling air that flows through the nacelle interior air passage 18, the wind turbine interior air passage 23, and the tower interior air passage 42 are increased, to thereby improve the cooling efficiency.

Seventh Embodiment

Figure 10:
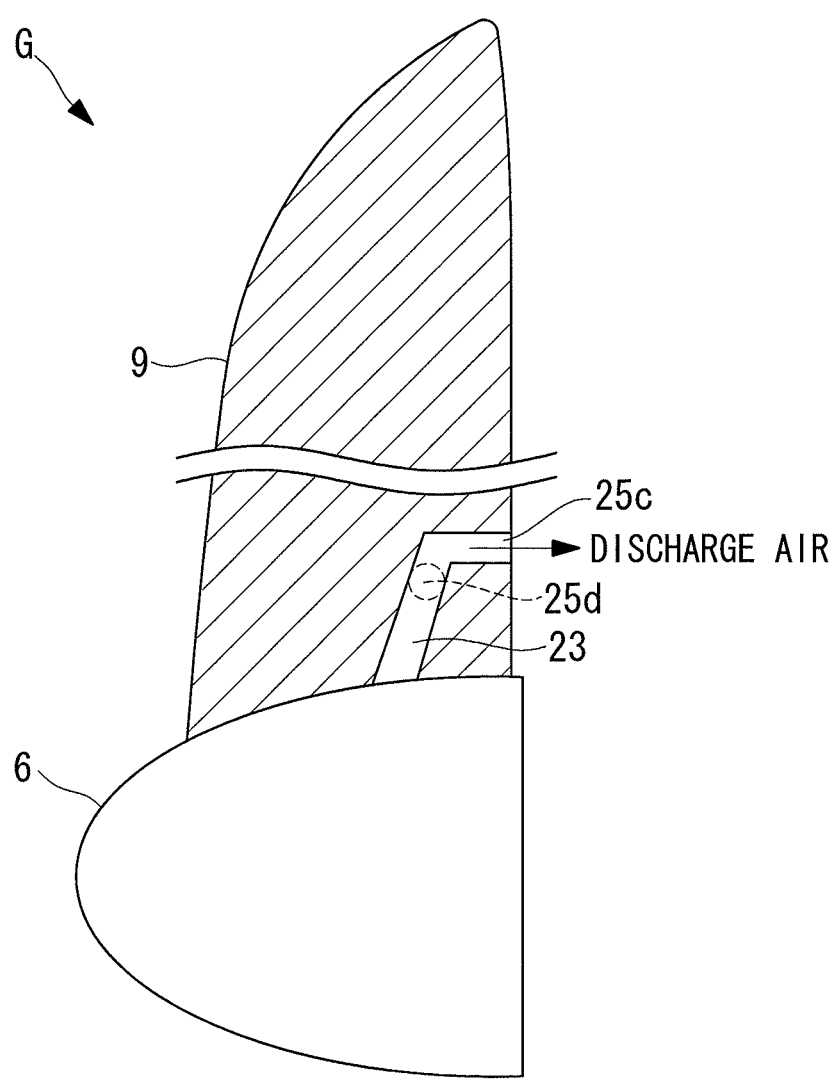
FIG. 10 is a schematic vertical sectional view of a wind turbine blade according to a seventh embodiment of the present invention.

FIG. 10 is a schematic vertical sectional view of the wind turbine blade 9 according to a seventh embodiment of the present invention. The wind turbine blade 9 may be applied to the wind turbine generating apparatuses 1A to 1E according to the first to fifth embodiments. The wind turbine blade 9 includes a cooling structure G. In the cooling structure G, an air outlet 25*c* of the wind turbine interior air passage 23 formed inside the wind turbine blade 9 is formed in the vicinity of a root of the wind turbine blade 9. To be more specific, the air outlet 25*c* is formed in a range of about 0.5 m from the root of the wind turbine blade 9. It is not preferable to provide the air outlet 25*c* too close to the root from the standpoint of the strength of the wind turbine blade 9. The air outlet 25*c* is also preferably formed on the leeward side to the wind direction. The air outlet 25*d* may be provided at a side surface position of the wind turbine blade 9 instead of the air outlet 25*c* provided at a trailing edge position of the wind turbine blade 9.

With the cooling structure G, the entire length of the wind turbine interior air passage 23 inside the wind turbine blade 9 can be reduced to avoid a pressure loss, and the flow speed and the flow rate of the cooling air can be increased to improve the cooling efficiency.

It goes without saying that the present invention is not limited to the aforementioned first to seventh embodiments. For example, the configurations of the first to seventh embodiments may be appropriately combined together.

What is claimed is:

1. A wind turbine generating apparatus comprising:
a rotor head that rotates upon receiving outside wind on a wind turbine blade;
a generator, installed inside a nacelle and driven by the rotor head, that generates electricity;
a nacelle interior air passage, provided inside the nacelle and having a heat transfer surface, through which outside air flows isolatedly from an interior space of the nacelle; and
a heat generating device installed in the interior space of the nacelle and provided in close contact with the heat transfer surface of the nacelle interior air passage,
wherein air existing in the interior space of the nacelle and the heat generating device provided inside the interior space of the nacelle are subjected to cooling by the outside air which flows inside the nacelle interior air passage.

2. The wind turbine generating apparatus according to claim 1, wherein the nacelle interior air passage is formed such that a passage area is reduced from an upstream side to a downstream side.

3. The wind turbine generating apparatus according to claim 1, wherein at least a portion of a wall body that is included in the nacelle has a double-walled structure with an outer wall and an inner wall that is provided inside the outer wall with a space therebetween, and the space between the outer wall and the inner wall is employed as the nacelle interior air passage.

4. The wind turbine generating apparatus according to claim 1, wherein at least one tubular outside air flow passage is provided inside the nacelle, and an inner portion of the outside air flow passage is employed as the nacelle interior air passage.

5. The wind turbine generating apparatus according to claim 1, further comprising a heat transferring means that transfers heat from the interior space of the nacelle to the nacelle interior air passage.

6. The wind turbine generating apparatus according to claim 1, wherein an asperity shape is provided on the nacelle interior air passage.

7. The wind turbine generating apparatus according to claim 1, further comprising a wind turbine interior air passage through which cooling air passing through the nacelle interior air passage is discharged outside after passing through a periphery of a heat generating device installed inside the rotor head and inside of the wind turbine blade.

8. The wind turbine generating apparatus according to claim 7, wherein an air outlet to outside of the wind turbine interior air passage is formed on a leeward side of the wind turbine blade to a wind direction.

9. The wind turbine generating apparatus according to claim 7, wherein the air outlet is formed in the vicinity of a root of the wind turbine blade.

10. The wind turbine generating apparatus according to claim 1, further comprising a tower interior air passage through which outside air flows as cooling air is provided inside a tower where the nacelle is installed at an upper end portion; and
a heat generating device installed in the interior space of the tower,
wherein the tower interior air passage is isolated from an interior space of the tower,
wherein the heat generating device is provided adjacent to the tower interior air passage, and
wherein the tower interior air passage communicates with the nacelle interior air passage.

11. A wind turbine generating apparatus comprising:
a rotor head that rotates upon receiving outside wind on a wind turbine blade;
a generator, installed inside a nacelle and driven by the rotor head, that generates electricity;
a nacelle interior air passage, provided inside the nacelle and having a heat transfer surface, through which outside air flows isolatedly from an interior space of the nacelle, wherein
the interior space is in effective conductive heat-transfer communication with the nacelle interior air passage, and wherein the nacelle is configured such that the nacelle interior air passage establishes a convection flow that extracts heat from the nacelle interior air passage transferred thereto from the interior space via the conductive communication, and wherein a heat generating device installed in the interior space is proved in close contact with the heat transfer surface of the nacelle interior air passage.

12. The wind turbine generating apparatus of claim 11, wherein:
the apparatus includes a heat generating device located in the interior space of the nacelle and provided adjacent to the nacelle interior air passage.

13. The wind turbine generating apparatus of claim 11, wherein:
the interior space is in effective fluid communication isolation with the nacelle interior air passage.

14. The wind turbine generating apparatus of claim 11, wherein:
the nacelle is configured such that forced air convection occurs inside the interior space in isolation from any flow of air through the nacelle air passage.

15. The wind turbine generating apparatus of claim 11, wherein:
the nacelle is configured such that the interior space is effectively fluidically isolated from the nacelle interior air passage.

16. The wind turbine generating apparatus of claim 11, wherein:
the nacelle is configured such that the nacelle interior air passage extends about a substantial amount of the circumference of the interior space.

17. The wind turbine generating apparatus of claim 11, wherein:
the nacelle is configured such that the nacelle interior air passage extends at least about 210 degrees about the circumference of the interior space.

18. The wind turbine generating apparatus of claim 11, wherein:
the interior space is hermetically sealed.

19. The wind turbine generating apparatus of claim 11, wherein:
the nacelle is configured such that the nacelle interior air passage cups the interior space.

20. The wind turbine generating apparatus of claim 11, wherein:
the apparatus includes a heat generating device located in the interior space of the nacelle that is in convective heat transfer isolation with respect to heat transfer paths extending from an inside of the interior space to the nacelle interior air passage.

* * * * *